(12) United States Patent
Zhou

(10) Patent No.: US 9,751,450 B1
(45) Date of Patent: Sep. 5, 2017

(54) TIE DOWN WITH AUTOMATIC STRAP TENSION ADJUSTMENT

(71) Applicant: Wesley Zhou, Aliso Viejo, CA (US)

(72) Inventor: Wesley Zhou, Aliso Viejo, CA (US)

( * ) Notice: Subject to any disclaimer, the term of this patent is extended or adjusted under 35 U.S.C. 154(b) by 0 days.

(21) Appl. No.: 15/481,468

(22) Filed: Apr. 7, 2017

(51) Int. Cl.
*B60P 7/08* (2006.01)

(52) U.S. Cl.
CPC ............. *B60P 7/083* (2013.01); *B60P 7/0853* (2013.01); *Y10T 24/2175* (2015.01)

(58) Field of Classification Search
CPC ....... B60P 7/083; B60P 7/0853; B60P 7/0823; B60P 7/0838; B60P 7/0861; Y10T 24/2175; Y10T 24/4773; A44B 11/125
See application file for complete search history.

(56) References Cited

U.S. PATENT DOCUMENTS

| | | | | |
|---|---|---|---|---|
| 5,560,086 A * | 10/1996 | Huang | ................. | B60P 7/083 24/68 CD |
| 6,007,053 A * | 12/1999 | Huang | ................. | B60P 7/083 254/223 |
| 6,641,116 B1 * | 11/2003 | Huang | ................. | B60P 7/083 24/68 CD |
| 7,107,655 B1 * | 9/2006 | Huang | ................. | B60P 7/0838 24/68 CD |
| 7,350,767 B2 * | 4/2008 | Huang | ................. | B60P 7/083 24/68 CD |
| 8,312,601 B2 * | 11/2012 | Huang | ................. | B60P 7/083 24/68 CD |
| 2006/0196015 A1 * | 9/2006 | Huang | ................. | B60P 7/0838 24/68 CD |
| 2006/0197071 A1 * | 9/2006 | Huang | ................. | B60P 7/083 254/217 |

* cited by examiner

*Primary Examiner* — Robert J Sandy
*Assistant Examiner* — Rowland Do
(74) *Attorney, Agent, or Firm* — Lapple Ubell IP Law, LLP; Franklin D. Ubell

(57) ABSTRACT

A tie down apparatus wherein a center leg of each of a pair of load springs is mounted in a space between a pair of drum pins, which space receives and holds a tied down strap. Each load spring is fixedly attached to a respective one of first and second ratchet wheels and has a tab having an outer end positioned in a respective arcuate slot of a respective circular plate, each circular plate being mounted to rotate with the drum pins.

4 Claims, 8 Drawing Sheets

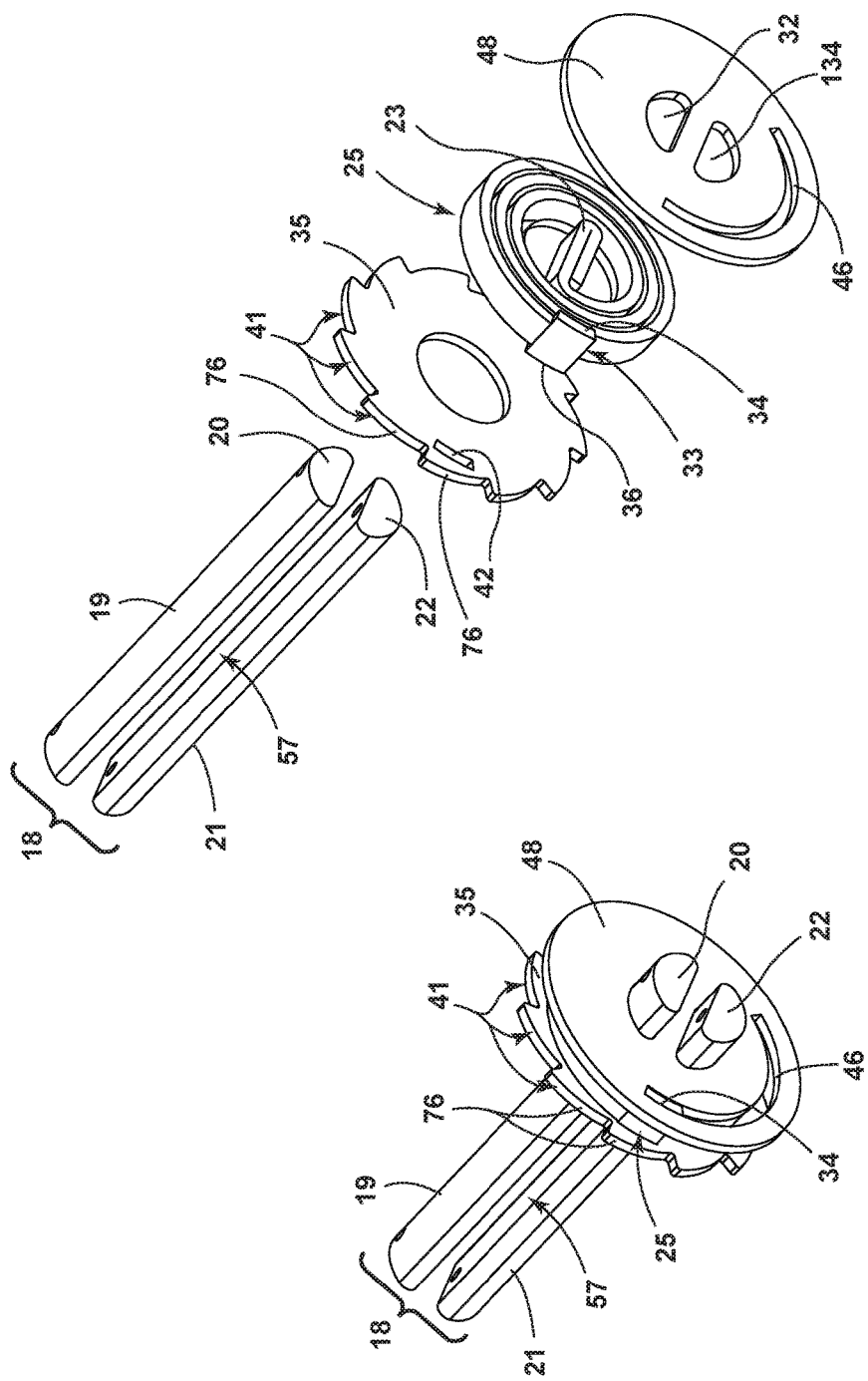

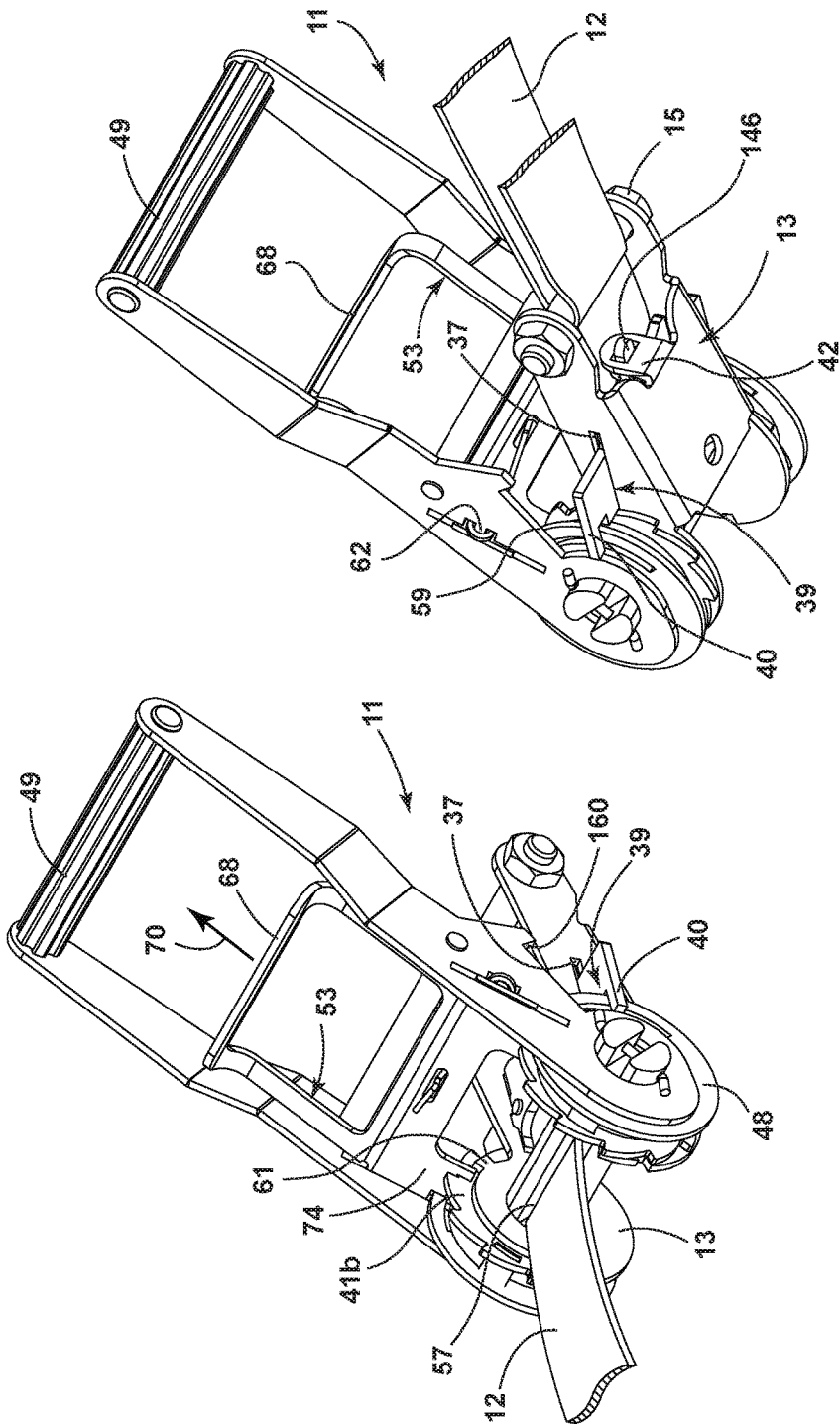

TIE DOWN WITH AUTOMATIC STRAP TENSION ADJUSTMENT

FIELD

The subject disclosure relates to tie down mechanisms and more particularly to a tie down mechanism featuring automatic adjustment of the tension applied to a strap component of the mechanism.

DESCRIPTION OF RELATED ART

Various tie down mechanisms have been constructed in the past and have been employed, for example, to tie down a load to a trailer or other transport apparatus. In such applications, such tie down mechanisms typically have a first strap which is secured to the load and a second strap which is attached to the trailer.

SUMMARY

According to an illustrative embodiment, a tie down apparatus includes a drum comprising first and second drum pins separated by a space, the space being shaped to receive and hold a tie down strap. The drum has first and second ratchet wheels rotatably mounted thereon at opposite ends thereof, the first and second ratchet wheels each comprising a plurality of ratchet teeth. First and second spiral load springs are each mounted adjacent an outer side of a respective one of the first and second ratchet wheels. Each spiral load spring has a center leg and a tab at an outer end thereof, each tab having an inner end and an outer end.

Further in the illustrative embodiment, first and second plates are mounted adjacent an outer side of a respective one of said first and second spiral load springs. Each of the first and second plates has first and second openings shaped to respectively receive opposite ends of the first and second drum pins and has respective arcuate slots formed therein.

In the illustrative embodiment, the center leg of each spiral load spring is inserted in the space between the first and second drum pins. The inner end of each tab of each spiral load spring is fixedly attached to a respective one of the first and second ratchet wheels, while the outer end of each tab is positioned in a respective arcuate slot of each plate.

According to the illustrative embodiment, rotation of the ratchet wheels to tighten the tie down strap pre-loads the spiral load springs to the same tension applied to the strap. If the strap were to lose tension below the preload spring rate of the spiral springs, then the springs act to force the drum pins to rotate and increase tension on the strap until the preload tension of the springs and the strap tension are in equilibrium or until the springs have lost all of their preload.

DESCRIPTION OF THE DRAWINGS

FIG. 4 is a perspective view of tension adjustment apparatus according to an illustrative embodiment in an assembled state;
FIG. 5 is an exploded view of the tension adjustment apparatus of FIG. 4;

FIG. 6 is a front perspective view of the tie down apparatus of the illustrative embodiment in a second position;
FIG. 7 is a rear perspective view of the tie down apparatus of FIG. 6.

DETAILED DESCRIPTION OF THE PREFERRED EMBODIMENTS

Figure 1:
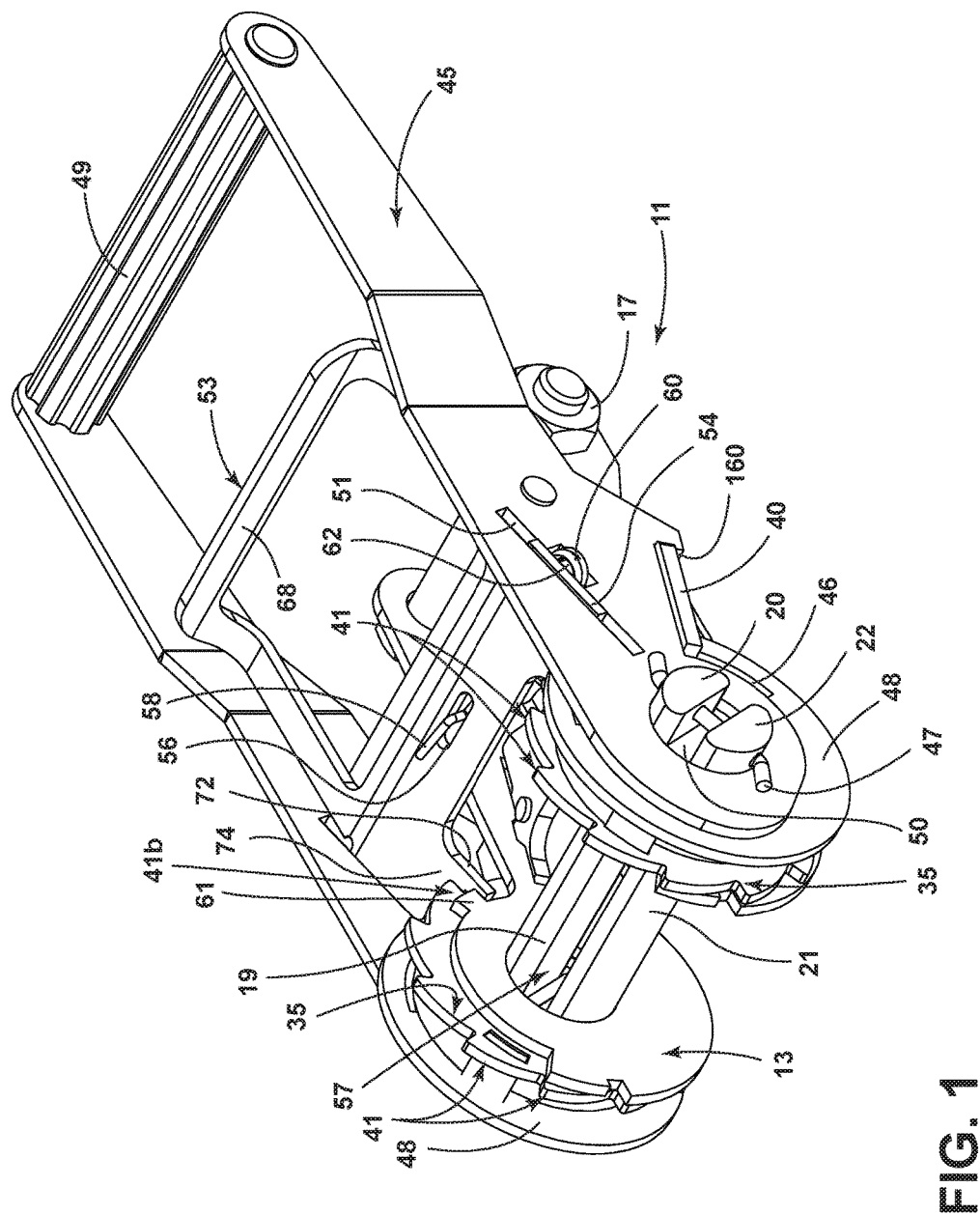
FIG. 1 is front perspective view of a tie down apparatus according to an illustrative embodiment in a first position.

FIGS. 1-7 show an illustrative embodiment of a tie down apparatus 11 with automatic strap tension adjustment. The illustrative embodiment 11 includes a base frame 13, which is attached to a fixed strap 12 (FIG. 6) secured by a bolt 15 and nut 17. A "drum" 18, which comprises two drum pins 19, 21, rotates in respective circular openings 50 in respective ends 29, 31 of the base frame 13. This drum 18 is caused to rotate by a respective center leg 23 of a respective main load spring 25, one spring 25 on each side of the drum 18 and positioned outside of the outer sides of respective first and second ratchet wheels 35. An inner end 36 of a tab 33 formed on the outer end of each main load spring 25 is inserted into a slot 42 of each ratchet wheel 35 and is fixedly attached to the respective ratchet wheel 35, for example, by welding.

In an illustrative embodiment, each main load spring 25 is a spiral wound spring. An outer end 34 of the tab 33 of each main load spring 25 rides in an arcuate slot 46 formed in a respective circular plate 48. Each circular plate 48 has slots 32, 134, which receive the ends 20, 22, of the drum pins 19, 21 and are shaped conformably such that the plates 48 are forced to rotate in unison with the drum pins 19, 21.

Figure 3:
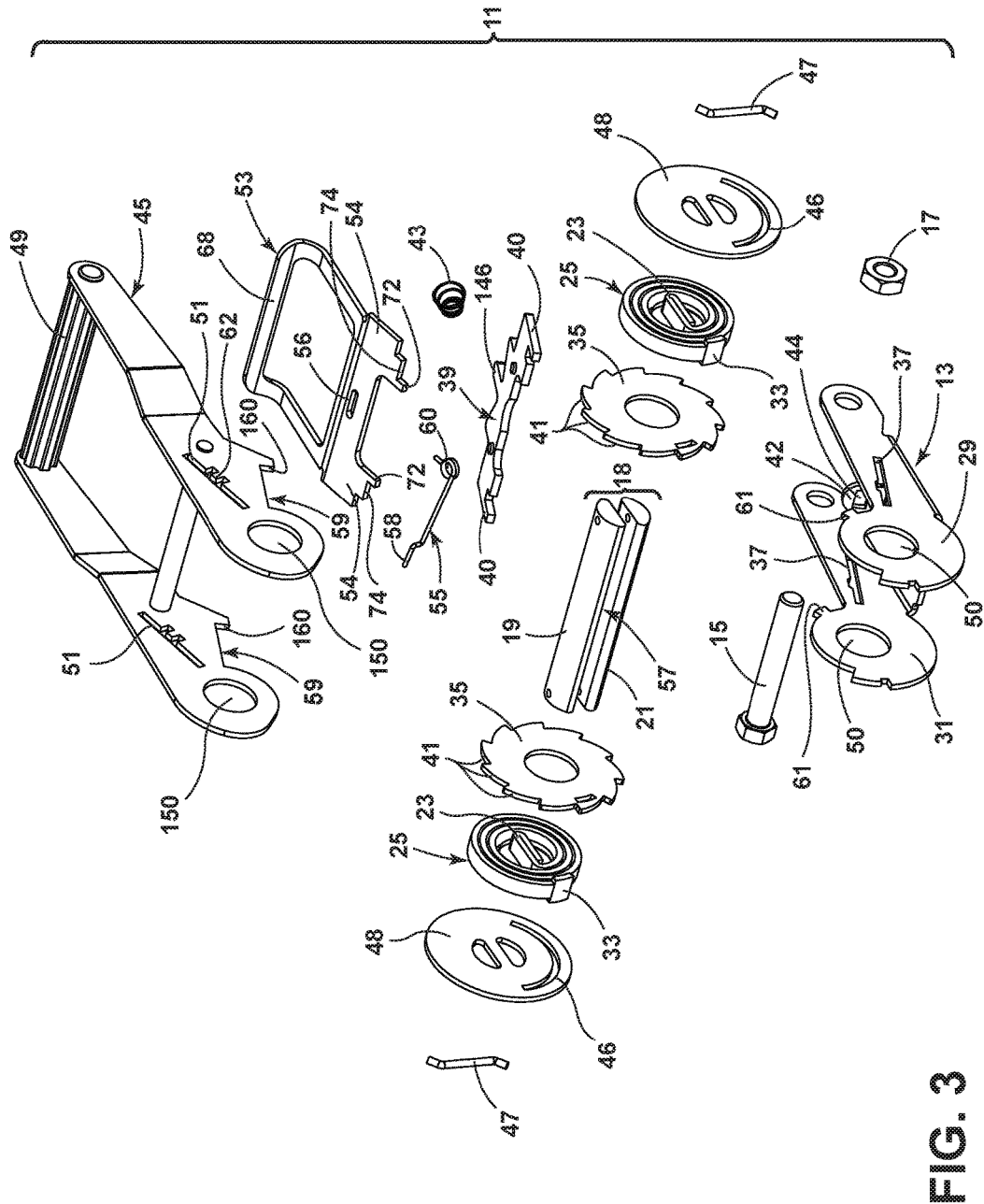
FIG. 3 is an exploded view of the tie down apparatus according to the illustrative embodiment.
Figure 8:
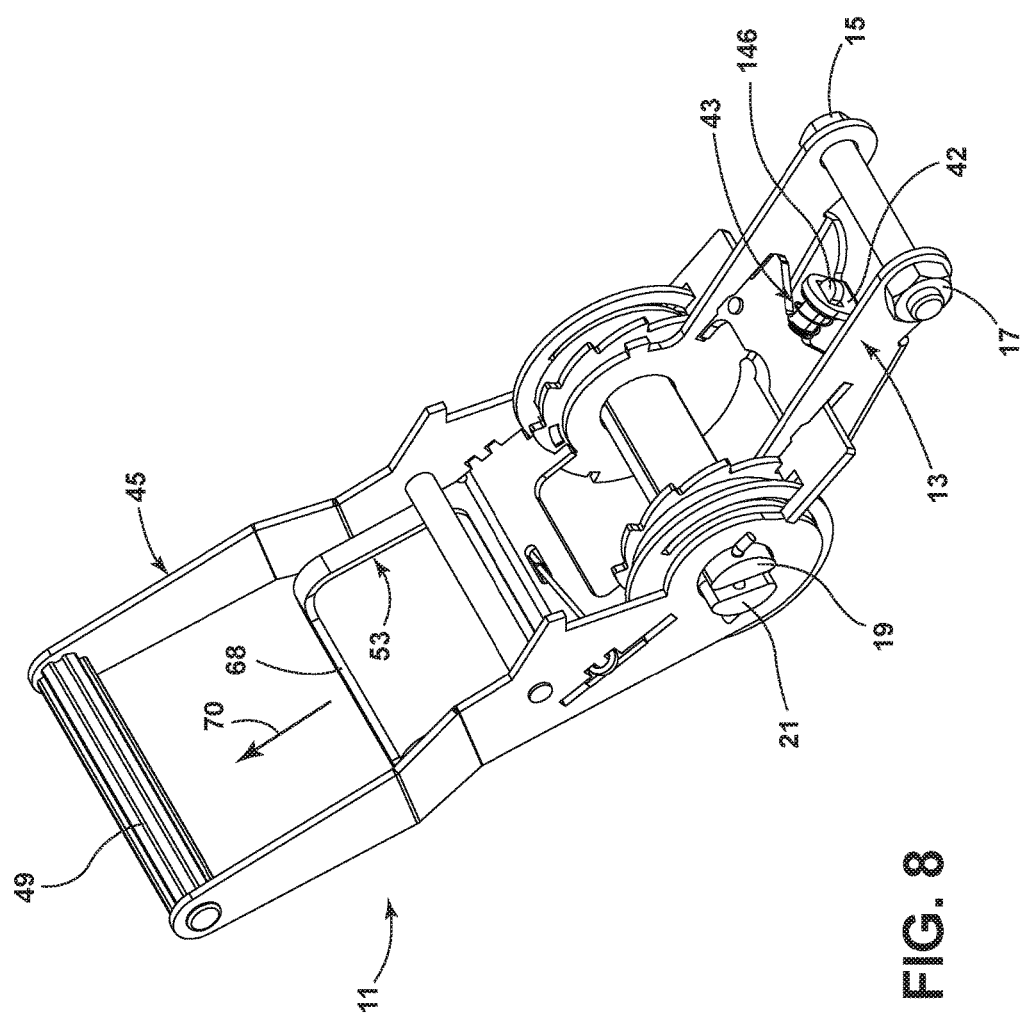
FIG. 8 is a perspective view of the tie down apparatus of the illustrative embodiment in a third position.

Each side of the base frame 13 has an angled slot 37 into which fits respective wings 40 of a main latch 39. The main latch 39 can slide in the slots 37 and engage the teeth, e.g. 41, of each ratchet wheel 35 and is spring loaded toward each ratchet wheel 35 by a main latch spring 43 (FIGS. 3, 8). The main latch spring 43 is mounted on a pin 146 projecting from a rear side of the main latch 39 and is held in place by an upright projection 42 on the base frame 13, which has a slot 44 (FIG. 3) through which the pin 146 fits.

A handle frame 45 has circular openings 150 (FIG. 3) through which project the respective ends, e. g. 20, 22, of the drum pins 19, 21. Two pins 47 respectively inserted through the drum pins 19, 21 on either side of the device serve to hold the mechanism together.

The handle frame 45 has a handle 49 at one end that is easy to grip and a pair of slots 51 in which fit respective wings 54 of a handle latch 53. The handle latch 53 slides in the slots 51 and engages respective teeth, e.g. 41b (FIG. 1), of each ratchet wheel 35. The handle latch 53 is spring loaded toward the ratchet wheel 35 by a handle spring 55 (FIG. 3). The handle latch 53 has a slot 56 in which fits one end 58 of the handle spring 55, while the coiled end 60 of the handle spring 55 fits over and is retained by a pin 62 formed in the slot 51 of the handle frame 45.

Figure 2:
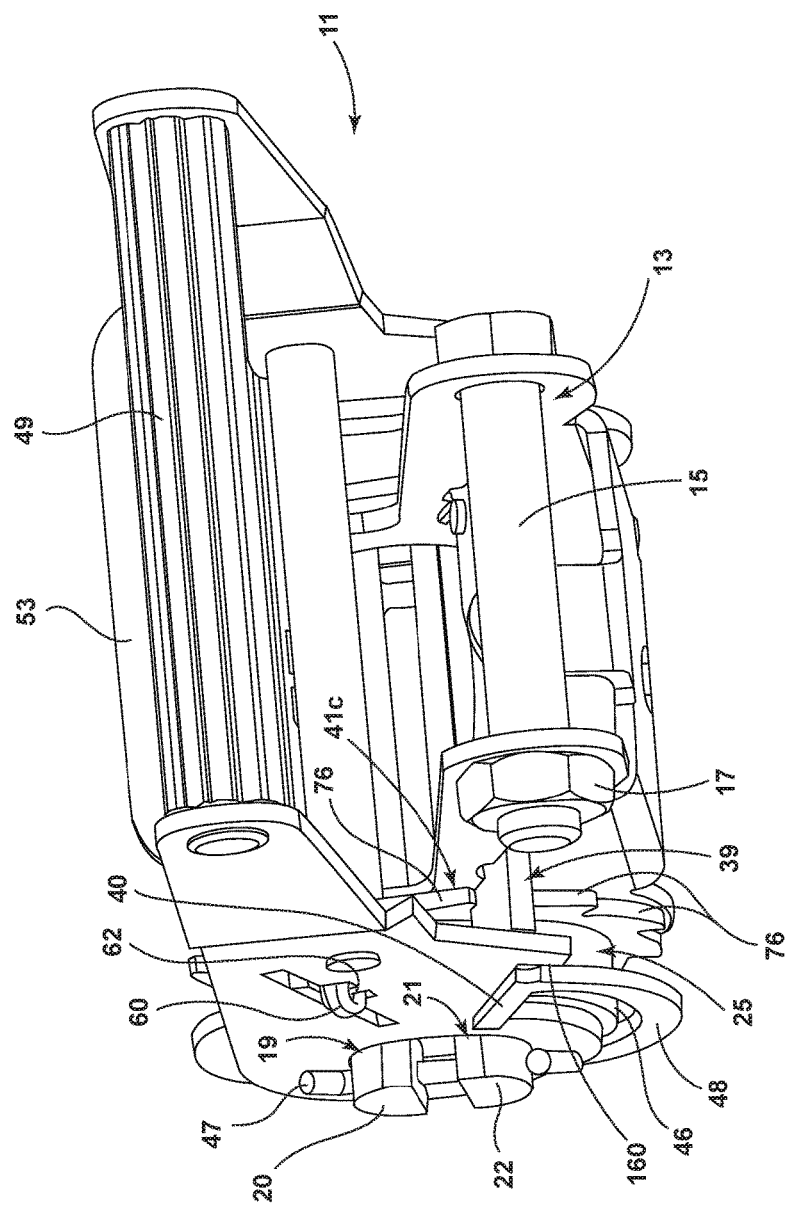
FIG. 2 is a rear perspective view of the tie down apparatus of FIG. 1.

The tie down 11 is used by inserting a strap 12 through the slot 57 in the between the two drum pins 19, 21, as shown in FIG. 6. As shown in FIG. 2, in a first position, the main latch 39 is engaging a tooth 41c of each of the ratchet wheels 35, specifically by engagement with the front surface of those two ratchet teeth, e.g. 41c. As shown in FIGS. 1 and 2, in the first position, the handle frame 45 is at its lowest point of rotation, lying generally parallel to the base frame 13. In this position, rear surfaces 160 of the respective recesses 59 (FIG. 3) of the handle frame 45 engage the respective wings 40 of the main latch 39 and prevent the main latch 39 from disengaging from the ratchet wheel teeth, e.g. 41c.

Additionally, in the first position shown in FIGS. 1 and 2, the extended surface 74 of the spring loaded handle latch 53 is engaging each ratchet wheel 35 via engagement with the front surface of a respective oppositely disposed pair of ratchet teeth, e.g. 41b. In this position, respective projections 72 on the handle latch 53 are also locked behind a respective step 61 formed on the circumference of the base frame 13, which prevents the handle latch 53 from rotating around the drum 18.

As illustrated in connection with FIG. 6, by pulling the handle 68 of the handle latch 53 against its spring bias away from the base frame 13 in the direction of arrow 70, the projections 72 on the handle latch 53 will clear the steps 61 in the base frame 13, and the handle frame 45 can then rotate into a second position shown in FIGS. 6 and 7. This action also clears wings 40 of the main load latch 39 from engagement with the rear surfaces 160 of the recesses 59 such that the main load latch 39 is now free to slide back and forth in its respective slots 37 while engaging the teeth, e.g. 41c, on each ratchet wheel 35.

By rotating the handle frame 45 through an arc from the second position to the third position shown in FIG. 8, each ratchet wheel 35 will rotate through the same arc. In an illustrative embodiment, this arc amounts to three ratchet teeth out of eleven total=an arc of approximately 98 degrees. This rotation causes each main load spring 25 to rotate the drum pins 19, 21 through the same angle, as long as there is no tension load on the strap 12. At the same time, the main load latch 39 shuttles back and forth following the rear cammed or contoured surfaces 76 (FIGS. 2, 4, 5) of three successive ratchet teeth 41 of each ratchet wheel 35, thus "ratcheting" three times in the illustrative embodiment. At the end of this ratcheting action, the main load latch 39 again engages behind the flat surface of the next successive ratchet tooth of each ratchet wheel 35, as shown in FIG. 2.

After the handle frame 45 reaches the third position of FIG. 8, it is rotated from the third position back to the second position while the handle latch 53 slides back and forth following the rear profile 76 of each ratchet wheel tooth, again "ratcheting" three times and engaging at the end of the travel behind the flat surface of another pair of ratchet teeth. During travel from the third position back to the second position, the drum pins 19, 21 do not rotate, and the tension on the strap is maintained by the main load latch 39.

Figure 10:
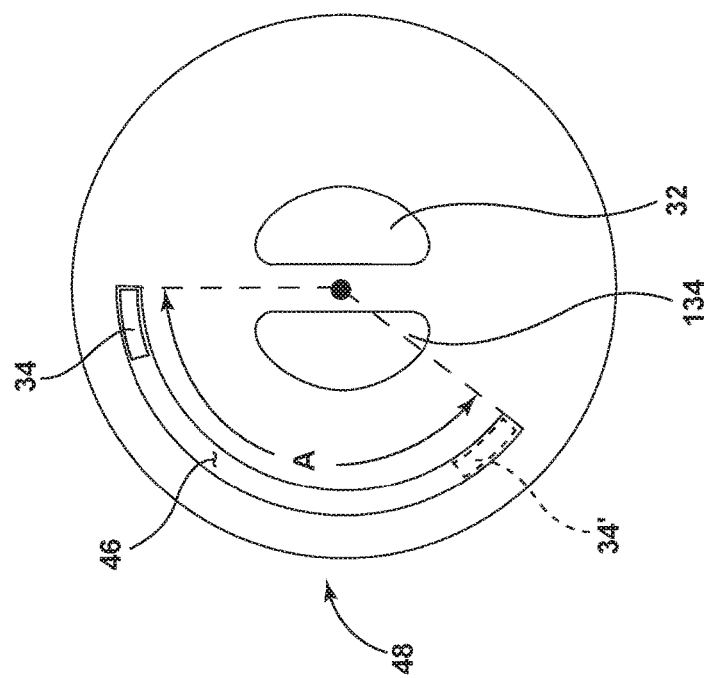
FIG. 10 is a front view of a plate component of the tension adjustment apparatus of FIGS. 4 and 5.

This process of rotating the handle frame 45 between the second and third positions will continue and in turn will put additional load on the strap 12, and therefore each main load spring 25 will also be preloaded to the same level of tension. As each main load spring 25 is preloaded, each outer end 34 of each tab 33 of each main load spring 25 will begin traveling in its respective slot 46 through an arc which is limited by the included angle A in the slot 46 in each plate 48. In an illustrative embodiment, as the spring 25 is wound to full preload, the outer end 34 moves through the slot 46 until it reaches the full preload position 34' at the opposite end of the arc as shown in FIG. 10. In the illustrative embodiment, the angle A is 110 degrees, but may range from 90 to 180 degrees in other embodiments, depending, for example, on the selected spring force. In the illustrative embodiment, the center of the arc of slot 46 is also the center of the circular plate 48.

Once each main load spring 25 has gone through an approximately 110 degree preload angle, the engagement of the outer ends 34 of the tabs 33 of each main load spring 25 with the slots 46 in the circular plates 48 will prevent further preload on the main load springs 25 to prevent overloading those springs 25, and any further tension generated by rotating the handle frame 45 from the second to the third position will now in turn directly rotate the drum pins 19, 21, and add additional load tension to the strap 12. When the tie down operation is complete, the tie down 11 is in the locked position shown in FIGS. 1 and 2.

In the event that the strap 12 were to lose tension below the preload spring rate of the main load springs 25, then the main load springs 25 will force the drum pins 19, 21, to rotate and increase tension on the strap 12 until the preload tension of the main load springs 25 and the strap tension are in equilibrium or until the main load springs 25 have lost all of their preload.

Figure 9:
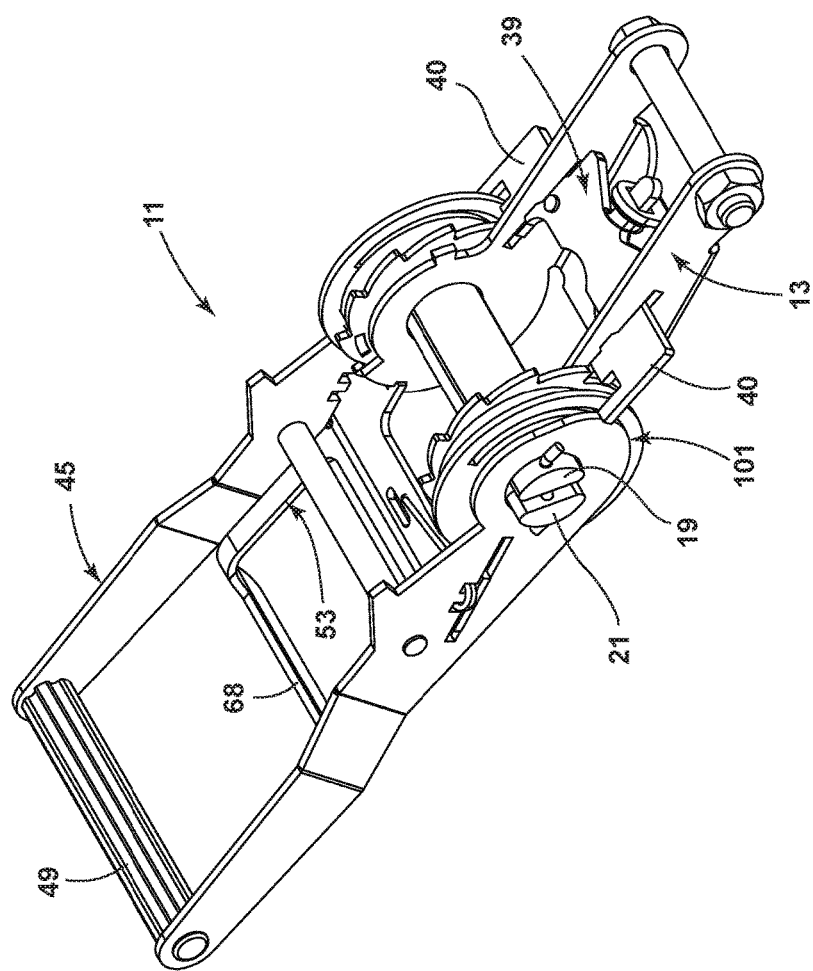
FIG. 9 is a perspective view of the tie down apparatus in a fourth position.

As shown in connection with FIG. 9, when the apparatus is in the position shown in FIG. 8, pulling on the handle latch handle 68 against its spring bias further in the direction of the arrow 70 allows the handle frame 45 to move into a fourth position shown in FIG. 9. This action disengages the handle latch 53 from the ratchet wheel teeth completely. At the same time, a ramp 101 on the exterior of the handle frame 45 also pushes the main load latch 39 away from the ratchet wheel teeth 41. This effectively allows the drum pins 19, 21 completely free rotation, removes the tension on the strap 12, and releases any remaining tension on the main load springs 25.

From the foregoing, those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:
1. A tie down apparatus comprising:
a drum comprising first and second drum pins separated by a space, the space being shaped to receive a tie down strap, the drum having first and second ratchet wheels rotatably mounted thereon at opposite ends thereof, the first and second ratchet wheels each comprising a plurality of ratchet teeth;
first and second spiral load springs, each mounted adjacent a respective one of the first and second ratchet wheels, each spiral load spring having a center leg and a tab at an outer end thereof, each tab having a first end and a second end;
first and second plates, each mounted adjacent a respective one of said first and second spiral load springs, each of the first and second plates having first and second openings shaped to respectively receive said first and second drum pins, each of the first and second plates further having an arcuate slot formed therein;
wherein the center leg of each spiral load spring is inserted in the space between the first and second drum pins, wherein one of the first and second ends of the tab of each spiral load spring is fixedly attached to a respective one of the first and second ratchet wheels, and wherein the other of the first and second ends of the tab of each spiral load spring is respectively positioned in a respective arcuate slot of the first and second plates.

2. The tie down apparatus of claim 1 further comprising:

a base frame having first and second flanges positioned on respective inner sides of said first and second ratchet wheels, the flanges being rotatably mounted to said drum;

a handle having first and second sides and first and second oppositely disposed slots therein and configured to mount on and rotate with respect to said drum;

a main latch mounted to slide in said base frame into and out of engagement with the ratchet teeth of each of the first and second ratchet wheels and being biased toward an engaged position;

wherein, as a ratchet tooth is advanced forward by rotation of said handle through a selected arc, said main latch is moved away from a ratchet tooth by engagement with a contoured rear surface of the ratchet tooth and then snaps into engagement with the front surface of the next ratchet tooth to hold the ratchet wheel in an advanced position; and wherein rotation of said handle through said selected arc loads each spiral spring up to a limit determined by the length of an arc of each said arcuate slot, whereafter the loaded spiral spring applies a force to said drum which causes the drum to take up slack in a said strap.

3. The tie down mechanism of claim 1 wherein each ratchet wheel has a slot which receives a respective said one of the first and second ends.

4. The tie down apparatus of claim 1 wherein each said plate is a circular plate.

* * * * *